(12) United States Patent
Aumont et al.

(10) Patent No.: US 7,249,462 B2
(45) Date of Patent: Jul. 31, 2007

(54) MOUNTING A TURBINE NOZZLE ON A COMBUSTION CHAMBER HAVING CMC WALLS IN A GAS TURBINE

(75) Inventors: Caroline Aumont, Paris (FR); Eric Conete, Merignac (FR); Mario De Sousa, Cesson la Foret (FR); Didier Hernandez, Quiers (FR); Georges Habarou, Le Bouscat (FR)

(73) Assignee: Snecma, Paris (FR)

( * ) Notice: Subject to any disclaimer, the term of this patent is extended or adjusted under 35 U.S.C. 154(b) by 211 days.

(21) Appl. No.: 11/153,349

(22) Filed: Jun. 16, 2005

(65) Prior Publication Data

US 2006/0010879 A1 Jan. 19, 2006

(30) Foreign Application Priority Data

Jun. 17, 2004 (FR) .................................. 04 06598

(51) Int. Cl.
*F23R 3/60* (2006.01)

(52) U.S. Cl. ..................... 60/796; 60/753; 415/209.3

(58) Field of Classification Search .................. 60/752, 60/753, 796, 800; 415/209.2, 209.3, 209.4
See application file for complete search history.

(56) References Cited

U.S. PATENT DOCUMENTS 3,608,310 A 9/1971 Vaught

| 4,076,451 | A | 2/1978 | Jankot |
| 4,365,933 | A | 12/1982 | Langer et al. |
| 4,643,636 | A | 2/1987 | Libertini et al. |
| 6,000,906 | A | 12/1999 | Draskovich |
| 6,648,597 | B1 | 11/2003 | Widrig et al. |
| 6,823,676 | B2 | 11/2004 | Conete et al. |
| 2002/0184887 | A1 | 12/2002 | Calvez et al. |
| 2002/0184891 | A1* | 12/2002 | Conete et al. ................ 60/796 |
| 2002/0184892 | A1 | 12/2002 | Calvez et al. |
| 2003/0002979 | A1* | 1/2003 | Koschier ................. 415/209.4 |
| 2005/0000228 | A1 | 1/2005 | De Sousa et al. |

FOREIGN PATENT DOCUMENTS

| EP | 1 152 191 A2 | 11/2001 |
| FR | 2 825 787 A1 | 12/2002 |
| GB | 695724 | 8/1953 |

* cited by examiner

*Primary Examiner*—L. J. Casaregola
(74) *Attorney, Agent, or Firm*—Rothwell, Figg, Ernst & Manbeck, PC

(57) ABSTRACT

The gas turbine comprises an annular combustion chamber having inner and outer walls made of ceramic matrix composite material, and a high pressure turbine nozzle secured to a downstream end of the combustion chamber and comprising a plurality of stationary airfoils extending between the inner and outer walls of an annular flow path through the nozzle for the gas stream coming from the combustion chamber. The turbine nozzle is made of ceramic matrix composite material and it is connected to the downstream end of the combustion chamber by brazing.

22 Claims, 6 Drawing Sheets

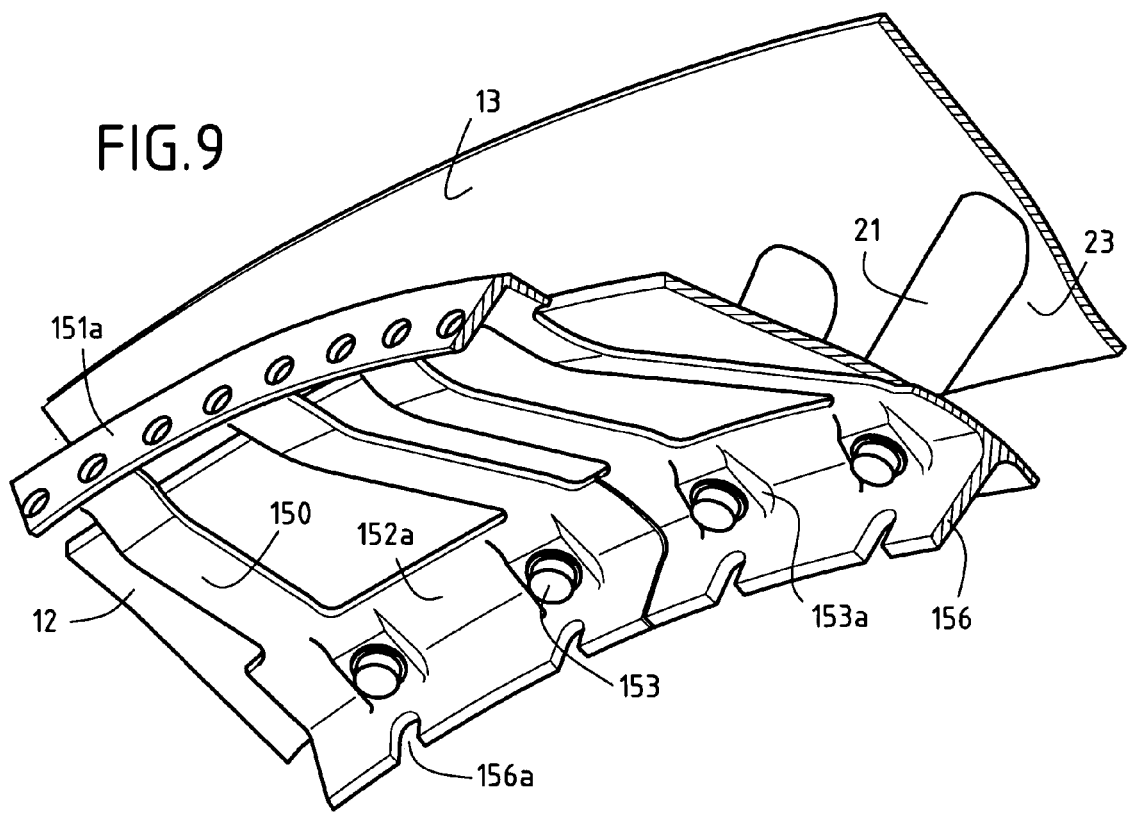
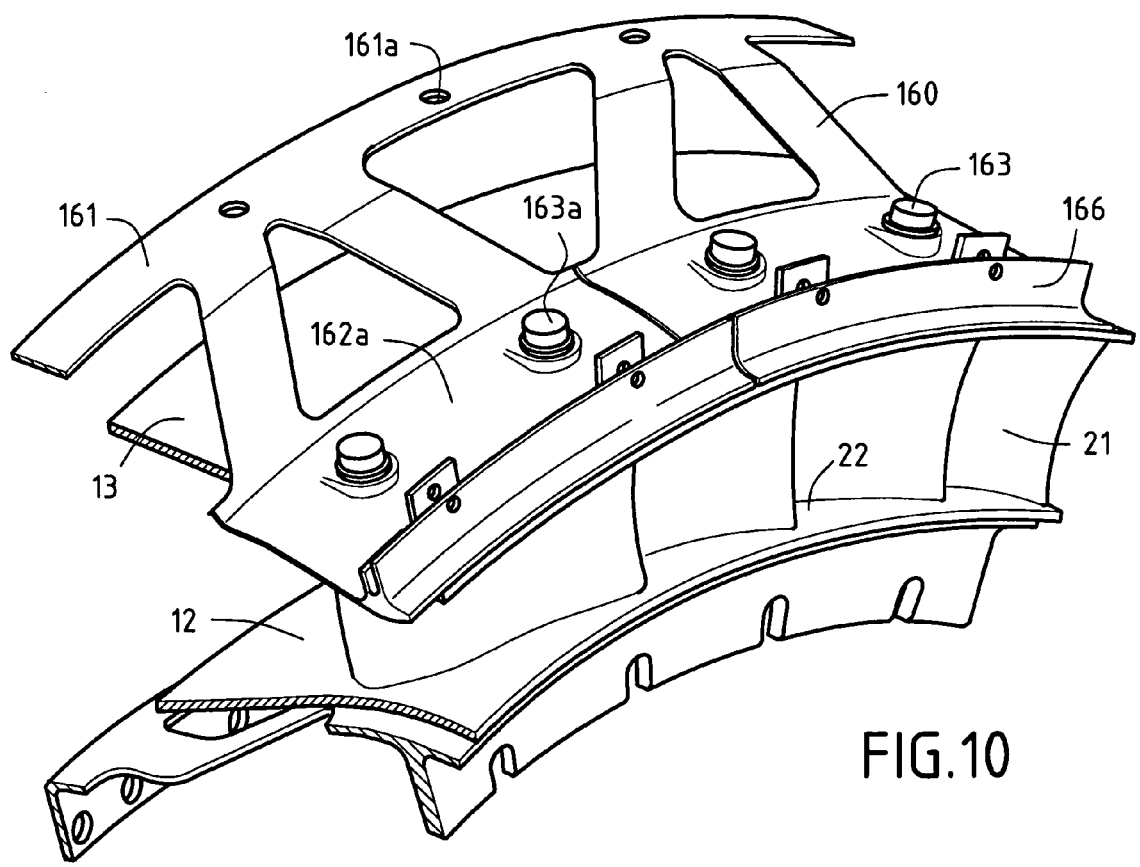

MOUNTING A TURBINE NOZZLE ON A COMBUSTION CHAMBER HAVING CMC WALLS IN A GAS TURBINE

BACKGROUND OF THE INVENTION

The invention relates to gas turbines, and more particularly to mounting a turbine nozzle on a combustion chamber having walls made of ceramic matrix composite (CMC) material. The fields of application of the invention are industrial gas turbines and also turbojets and turboprops for airplanes.

CMCs have been proposed in making the walls of gas turbine combustion chambers because of the thermostructural properties of CMCs, i.e. their ability to conserve good mechanical properties at high temperatures. The requirements to improve efficiency and to reduce emissions of polluting species both lead to seeking an ever-higher combustion temperature.

Document FR 2 825 787 shows an annular combustion chamber made of CMC that is mechanically connected to a high pressure turbine nozzle (the inlet stage of the turbine). The turbine nozzle is made up of stationary vanes comprising platforms with airfoils extending between platforms. The platforms are made of metal and are in the form of ring sectors having inside surfaces that define a flow path through the nozzle for the stream of gas coming from the combustion chamber. Mechanical connection is provided by bolting the downstream end portions of the inner and outer walls of the combustion chamber to the inner and outer platforms of the turbine nozzle, while simultaneously taking care to provide a mechanical connection via flexible linking members which hold the chamber-and-nozzle assembly between the inner and outer shrouds of a metal casing.

Mounting the turbine nozzle on the downstream end portion of the combustion chamber, instead of mounting it by means of a direct mechanical connection with the metal casing, as is conventional, provides several advantages: there is a better guarantee that the gas stream flowing out from the combustion chamber into the nozzle is properly aligned, and it is simpler to achieve sealing at the interface between the combustion chamber and the nozzle.

Nevertheless, difficulties remain relating to assembling together parts made of materials (CMC and metal) that have different coefficients of thermal expansion. In addition, although sealing the interface between the combustion chamber and the turbine nozzle is performed more easily, it still remains necessary to provide sealing between the nozzle platforms that are in the form of ring sectors.

OBJECT AND SUMMARY OF THE INVENTION

An object of the invention is to provide an effective mount for a turbine nozzle on a combustion chamber having walls made of CMC, serving in particular to reduce the number of parts needed, thus saving weight, and also simplifying structure.

This object is achieved by a gas turbine comprising an annular combustion chamber with inner and outer walls of ceramic matrix composite material, a high pressure turbine nozzle integral with a downstream end of the combustion chamber and comprising a plurality of stationary airfoils extending between the inner and outer walls of an annular flow path through the nozzle for the gas stream coming from the combustion chamber, in which gas turbine, according to the invention, the turbine nozzle is made of a ceramic matrix composite material and is connected to the downstream end of the combustion chamber by brazing.

Making the turbine nozzle out of CMC and connecting it to the combustion chamber by brazing achieves a very significant saving in weight, compared with a turbine nozzle made of metal, because of the lower density of CMCs, and it also enables the problem of continuity between the combustion chamber and the nozzle to be solved more effectively.

Advantageously, the downstream portions of the inner and outer walls of the combustion chamber are extended to the downstream end of the turbine nozzle so as form the inner and outer walls of the flow path to which the airfoils are connected by brazing. Thus, the extensions of the combustion chamber walls act in simple manner to guarantee continuity and sealing for the gas stream flowing through the turbine nozzle.

Each airfoil may be brazed at a first radial end in a housing formed in the thickness of one of the inner and outer walls of the flow path, and each may be engaged at its opposite, second radial end in an opening formed in the other one of the inner and outer walls of the flow path, and the airfoils are advantageously brazed in said openings.

The assembly formed by the combustion chamber and the turbine nozzle can be held inside a metal casing comprising an inner metal shroud and an outer metal shroud by means of inner linking members and outer linking members connecting said assembly respectively to the inner and outer shrouds.

In a first embodiment, the linking members comprise internal linking tabs of ceramic matrix composite material each having a first end connected to the inner metal shroud and a second end connected to the combustion chamber and turbine nozzle assembly, and outer linking tabs of ceramic matrix composite material each having a first end connected to the outer metal shroud and a second end connected to the combustion chamber and turbine nozzle assembly.

Advantageously, the second ends of the linking tabs are integral with inner or outer annular ferrules of ceramic matrix composite material connected respectively to the outside surfaces of the extensions of the combustion chamber walls forming the inner and outer walls for the flow path through the turbine nozzle. The radial ends of the airfoils passing through one of the walls of the flow path in the nozzle can then be brazed to one of said annular ferrules made of CMC.

Advantageously, the inner or outer annular ferrule made of CMC carries a portion that co-operates with a flange integral with the inner or outer metal shroud in order to hold a sealing gasket that closes a downstream end of the annular space between the combustion chamber and turbine nozzle assembly and the inner or outer metal shroud.

The first ends of the outer and inner linking tabs made of CMC may be fastened directly to the inner and outer metal shrouds, respectively.

In a variant, the first ends of the inner and outer linking tabs are connected to the inner and outer metal shrouds via flexible metal tabs. The flexible metal tabs may have first ends connected to the ceramic matrix composite material linking tabs and second ends integral with a ferrule fastened to the metal shroud.

In a second embodiment, the linking members comprise inner and outer metal linking tabs having first ends connected to the inner and outer metal shrouds respectively, and second ends connected to the combustion chamber and turbine nozzle assembly.

The second ends of the metal linking tabs may be integral with sectorized inner and outer metal platforms fastened respectively to the extensions of the combustion chamber walls that form the inner and outer walls of the flow path through the turbine nozzle.

The sectorized platforms may be mechanically connected to the combustion chamber and turbine nozzle assembly by means of screws passing through the extensions of the combustion chamber walls that form the inner and outer walls of the turbine nozzle, and that are screwed into the airfoils. It is possible to use metal screws or screws made of CMC.

Advantageously, the inner or outer sectorized platform carries a portion that co-operates with a flange integral with the inner or outer metal shroud in order to hold an annular sealing gasket closing a downstream end of the annular space between the combustion chamber and turbine nozzle assembly and the inner or outer metal shroud.

The first ends of the inner or outer metal linking tabs may be integral with flanges fastened respectively to the inner and outer metal shrouds, respectively.

According to an advantageous feature of the invention, means other than the linking members are provided to prevent the turbine nozzle from turning relative to at least one of the metal shrouds so as to avoid turning forces induced on the airfoils of the nozzle by the gas stream coming from the chamber being taken up by the linking members.

BRIEF DESCRIPTION OF THE DRAWINGS

The invention will be better understood on reading the following description given by way of non-limiting indication and with reference to the accompanying drawings, in which:

FIGS. 9 and 10 are fragmentary perspective views showing the connection between the combustion chamber and turbine nozzle assembly and the inner and outer metal shrouds in the FIG. 8 embodiment.

DETAILED DESCRIPTION OF EMBODIMENTS OF THE INVENTION

Figure 1:
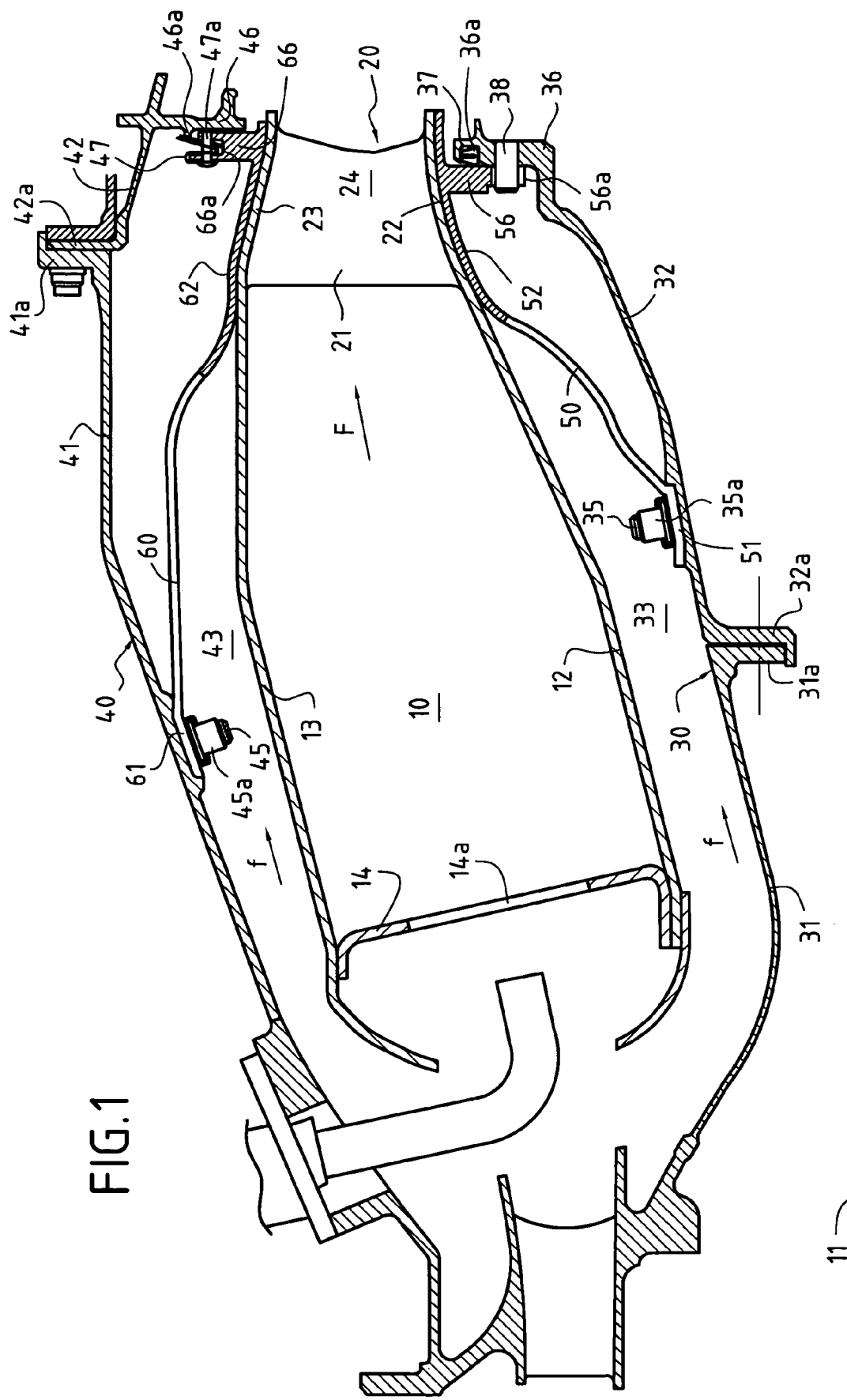
FIG. 1 is an axial half-section view of a portion of a gas turbine in a first embodiment in accordance with the invention.

FIG. 1 is an axial half-section view showing a portion of a gas turbine comprising a circular combustion chamber 10, a high pressure (HP) turbine nozzle 20 situated downstream from the combustion chamber 10 and connected directly thereto, a metal casing comprising inner and outer metal shrouds 30 and 40, and inner and outer linking tabs 50 and 60 holding the chamber and nozzle assembly 10 and 20 in the metal casing. In the description below, the terms "upstream" and "downstream" are used with reference to the flow direction (arrow F) of the gas stream coming from the chamber 10.

The combustion chamber 10 is defined by an inner annular wall 12 and an outer annular wall 13 on the same axis 11, and by an end wall 14 fastened to the walls 12 and 13. In well-known manner, the end wall 14 presents openings 14a distributed around the axis 11 to house injectors enabling fuel and oxidizer to be injected into the chamber 10. The walls 12 and 13 of the chamber 10 are made of CMC, for example a composite material having a silicon carbide (SiC) matrix, and the end wall 14 may also be made of CMC material.

The HP turbine nozzle 20, which constitutes the inlet stage of the turbine, comprises a plurality of stationary vanes or airfoils distributed angularly around the axis 11. The airfoils 21 have their ends integral with inner and outer walls 22 and 23. The inside faces of the walls 22 and 23 define a flow path 24 through the nozzle for the gas stream coming from the combustion chamber.

According to a characteristic of the invention, the turbine nozzle 20 is made of CMC, advantageously of the same material as the walls 12 and 13 of the chamber 10, and it is secured to the downstream ends of the walls 12, 13 by brazing.

Figure 2:
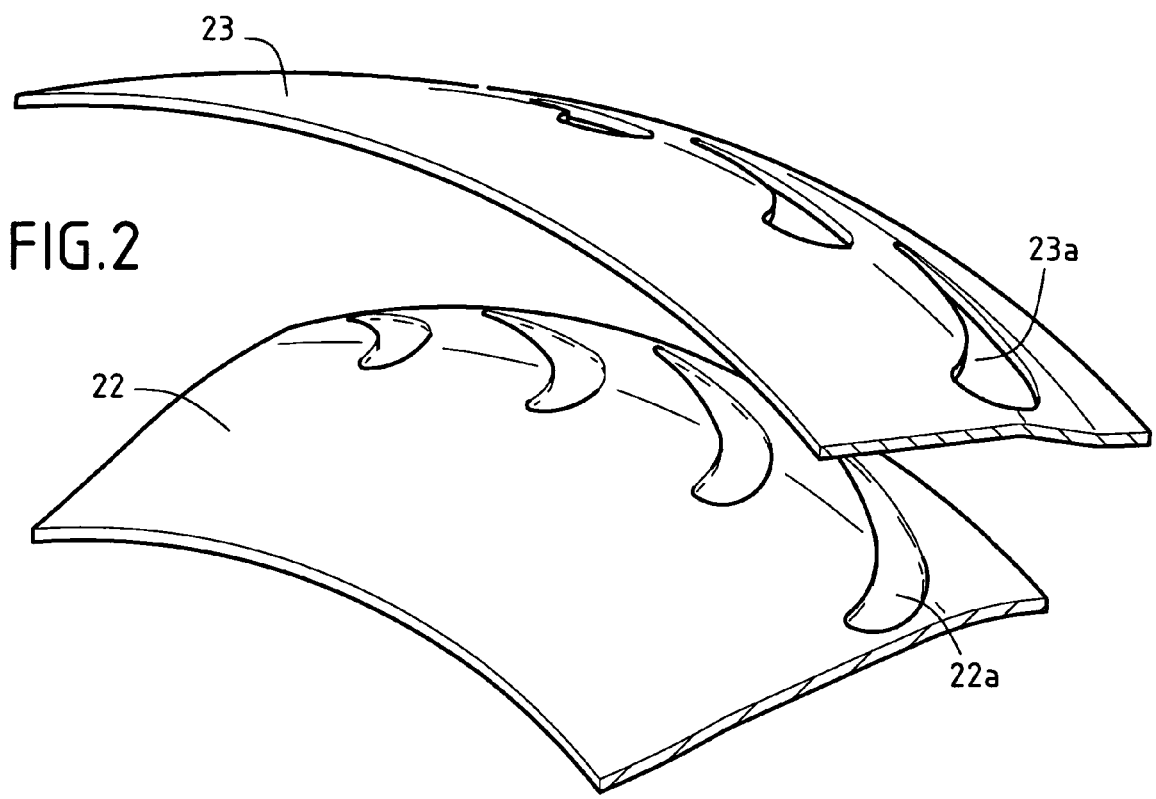
FIG. 2 is a fragmentary perspective view of the downstream end portions of the inner and outer walls of the combustion chamber together with the extensions thereof, in the FIG. 1 embodiment.

Advantageously, and as shown in the example, the walls 22 and 23 are constituted by extensions of the walls 12 and 13, forming single pieces together therewith. As shown in FIG. 2, each CMC airfoil 21 is mounted between the walls 22 and 23 by having one radial end disposed in a housing or indentation formed in a fraction of the thickness of one of the walls 22, 23, e.g. the wall 22, and having its other radial end engaged in a through opening formed through the other wall 23. The indentations 22a and the openings 23 are of shapes complementary to the shapes of the radial end portions of the airfoils 21. Naturally, it is also possible to provide blind indentations in the wall 23 and through openings in the wall 22.

The airfoils 21 are connected to the walls 22 and 23 by brazing. A brazed connection is arranged in the bottom of each indentation 22a and possibly along the edges thereof, with the indentations 22a then being slightly greater in size than the end portions of the airfoils 21 that are engaged therein. A brazed connection is provided along the side edges of each opening 23a, with the openings 23a being of dimensions that are slightly greater than those of the end portions of the airfoils 21 that are engaged therein.

The inner metal shroud 30 comprises two portions 31 and 32 united by bolting via respective inwardly-directed flanges 31a and 32a. Similarly, the outer metal shroud 40 comprises two portions 41 and 42 united by bolting via respective outwardly-directed flanges 41a and 42a. The spaces 33 and 43 respectively between the wall 12 and the inner shroud 30 and between the wall 13 and the outer shroud 40 both convey a flow of secondary cooling air (arrows f) flowing around the chamber 10. Perforations (not shown) are advantageously formed through the walls 12, 13, practically all the way to where they join the walls 22, 23, so as to allow the air that is flowing along the spaces 33 and 43 to form and maintain a cooling film along the inside surfaces of the walls 12 and 13, thereby protecting them.

The assembly formed by the combustion chamber 10 and the turbine nozzle 20 is held in the metal casing by means of inner and outer linking members which connect the assembly to the inner and outer shrouds 30 and 40.

Figure 3:
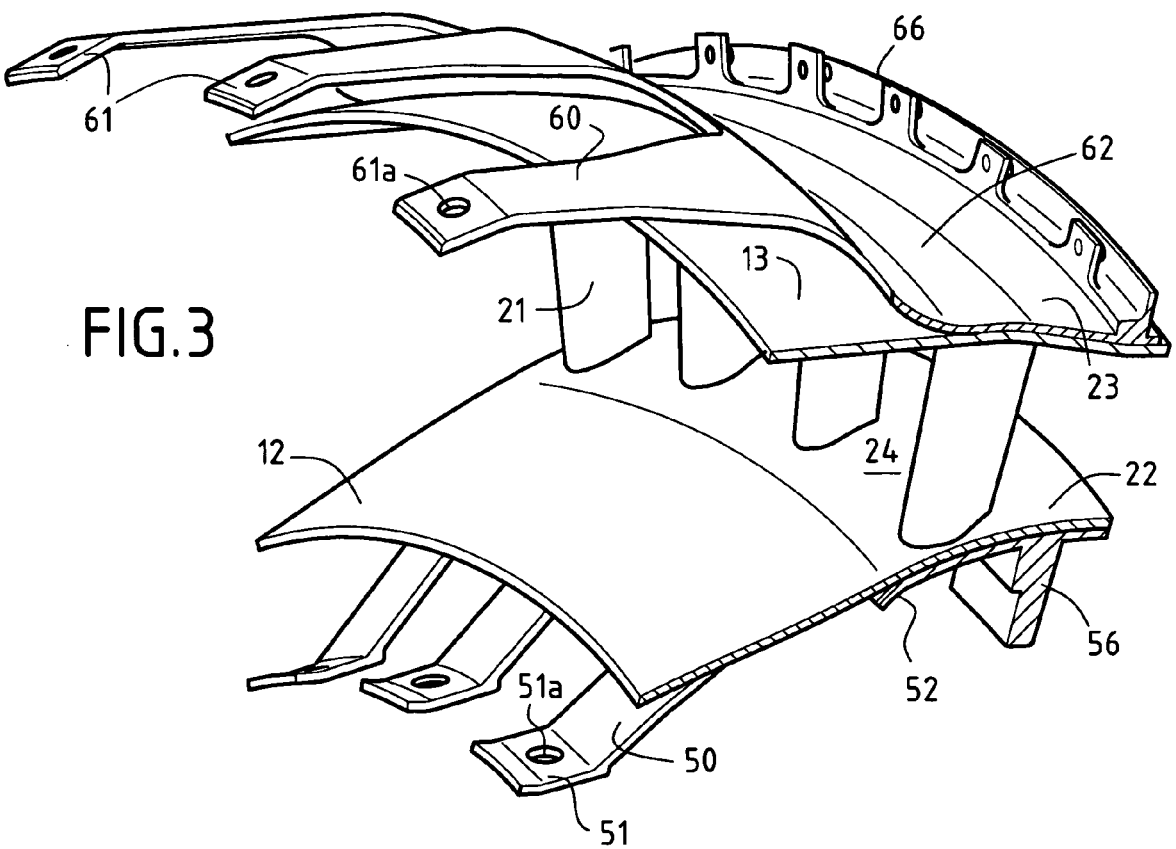
FIGS. 3 and 4 are fragmentary perspective views showing more particularly the connections between the combustion chamber and turbine nozzle assembly and the inner and outer metal shrouds in the FIG. 1 embodiment.
Figure 4:
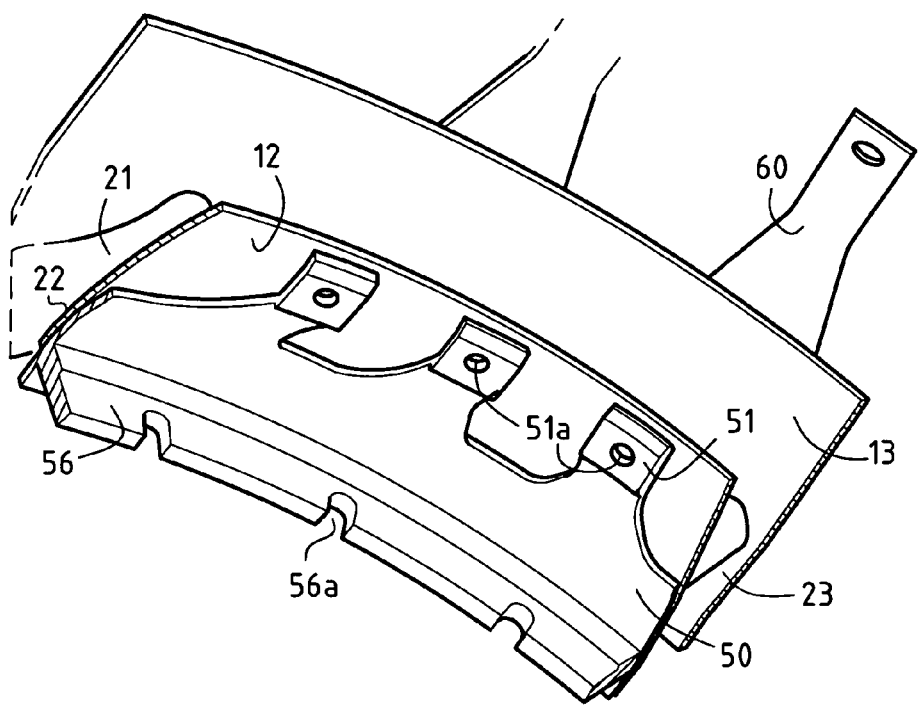

In the embodiment of FIGS. 1, 3, and 4, the inner linking members comprise linking tabs 50 made of CMC. At a first end, each tab 50 is fastened to the shroud 30 by bolting, their end portions 51 presenting orifices 51a for passing threaded rods 35 that are integral with the shroud 30, and onto which nuts 35a are engaged. At its other end, each tab 50 is integral with an inner annular end ferrule 52 of CMC which unites the tabs with one another. The ferrule 52 is advantageously made as a single piece together with the tabs 50. As shown in FIG. 3, the ferrule 52 is pressed against the outside surface of the inner wall 22 of the nozzle. The ferrule 52 is secured to the wall 22. The connection may be implemented in particular by brazing, by installing linking pieces (clips), or indeed by stitching.

In similar manner, the outer linking members comprise linking tabs 60 made of CMC. At a first end, each tab 60 is fastened to the shroud 40 by bolting, with the end portion 61 of each tab 60 presenting an orifice 61a for passing a threaded rod 45 integral with the shroud 40 and having a nut 45 engaged thereon. At its opposite ends, the tabs 60 are integral with an outer annular end ferrule 62 of CMC that unites them. The ferrule 62 is pressed against the outside surface of the outer wall 23 of the nozzle. The ferrule 62 is secured to the wall 23. The connection may be provided in particular by brazing, by implanting linking pieces (or clips), or indeed by stitching.

In the example shown, the inner and outer ferrules 52 and 62 cover practically the entire outside surfaces of the walls 22 and 23, extending almost all the way to the downstream ends thereof. Nevertheless, the ferrules 52 and 62 could be brazed to the walls 22 and 23 along one or more continuous circumferential strips extending over a fraction only of the length of the walls 22 and 23 (in the axial direction).

Advantageously, the outer ferrule 62 is also brazed to the radial end faces of the airfoils 21 that pass through the openings 23a. Under such circumstances, it is possible to omit brazing these radial ends of the airfoils 21 to the edges of the openings 23a, with the radial ends of the airfoils then being engaged without clearance in the openings 23a.

To braze the airfoils 21 to the walls 22, 23 and to the ferrules 52, 62, it is possible to use any brazing composition that is known for assembling CMC materials together. By way of example, particularly when using composite materials with a silicon carbide matrix, it is possible to use brazing compositions such as those described in the documents EP 0 806 402 or U.S. Pat. No. 5,975,407, or the brazing composition "Ticusil" from the supplier Wesgo Metals.

In order to accommodate differential expansion between the CMC material and the metal of the shrouds 30, 40, the linking tabs 50, 60 present a certain amount of flexibility, i.e. an ability to deform elastically. This may be conferred on them by giving the tabs 50, 60 a curved or folded shape, e.g. an S-shape.

The inner ferrule 52 carries a radial annular flange 56 which cooperates with a radial flange 36 integral with the inner shroud, substantially level with the downstream end of the turbine nozzle, in order to hold an annular sealing gasket 37 at that location. By way of example, the gasket 37 is of the "omega" type and closes off the downstream end of the space 33. The gasket 37 is received in a groove 36a formed in the upstream face of the flange 36 and it presses against the downstream face of the flange 56.

The outer ferrule 62 also carries a radial annular flange 66 which co-operates with a radial flange 46 integral with the outer shroud 40 substantially level with the downstream end of the turbine nozzle for the purpose of holding an annular sealing gasket 47. The gasket 47 closes off the downstream end of the space 43. By way of example, the gasket 47 is of the strip type. It is held in a housing 66a formed in the outer end of the flange 66 by means of pins 47a. Outside the housing 66a, the gasket 47 presses against a rib 46a formed on the upstream face of the flange 46.

Naturally, the gaskets 37 and 47 could be of other shapes, for example, it would be possible to use an omega-type gasket for the gasket 47 and a strip-type gasket for the gasket 37.

The flange 36 also carries locking fingers 38 which constrain the flanges 36 and 56 in rotation about the axis 11 by engaging in housings 56a in the flange 56.

Thus, the turbine nozzle 20 is prevented from turning about the axis 11 via the flange 56 and the brazing between the ferrule 52 and the wall 22. The forces induced on the airfoils 21 by the gas stream passing through the nozzle are therefore not taken up by the linking tabs 50, 60, so the tabs need only be dimensioned to be capable of supporting the combustion chamber and turbine nozzle assembly.

Preventing the nozzle 20 and the outer metal shroud from turning relative to each other could also be provided either by replacing the locking relative to the inner metal shroud, or else by providing locking relative to both shrouds in order to distribute forces better. For this purpose, for example, the pins 47a for fastening the gasket 47 may be extended downstream as to engage in housings formed in the flange 46.

It should also be observed that holes or multiple perforations could be formed through the assembly comprising the ferrule 52 and the wall 22 and through the assembly comprising the ferrule 62 and the wall 23 so as to cool the airfoils 21, and also cool the inside surfaces of the walls 22 and 23 of the nozzle by injecting air taken from the spaces 33 and 43.

Figure 5:
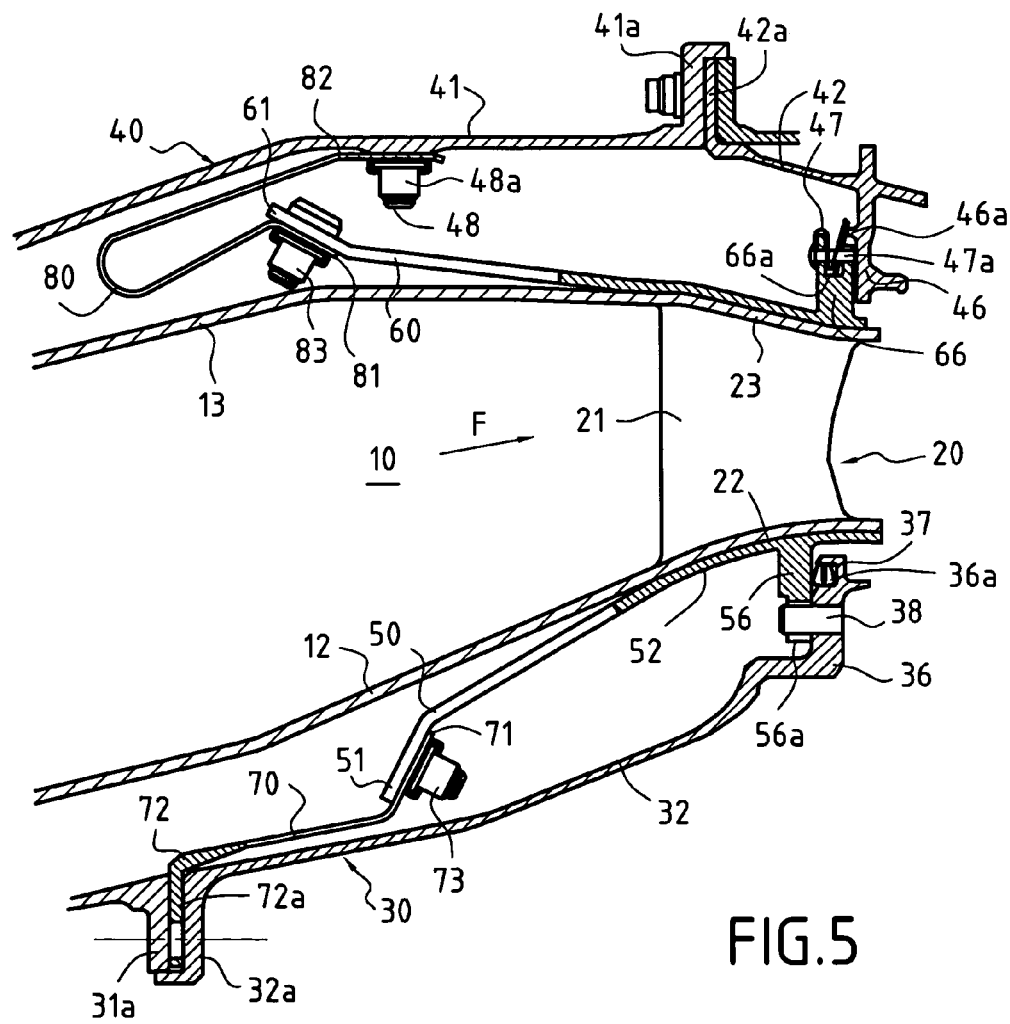
FIG. 5 is an axial half-section view similar to FIG. 1 showing a variant embodiment of the linking members between the combustion chamber and turbine nozzle assembly and the inner and outer metal shrouds.
Figure 6:
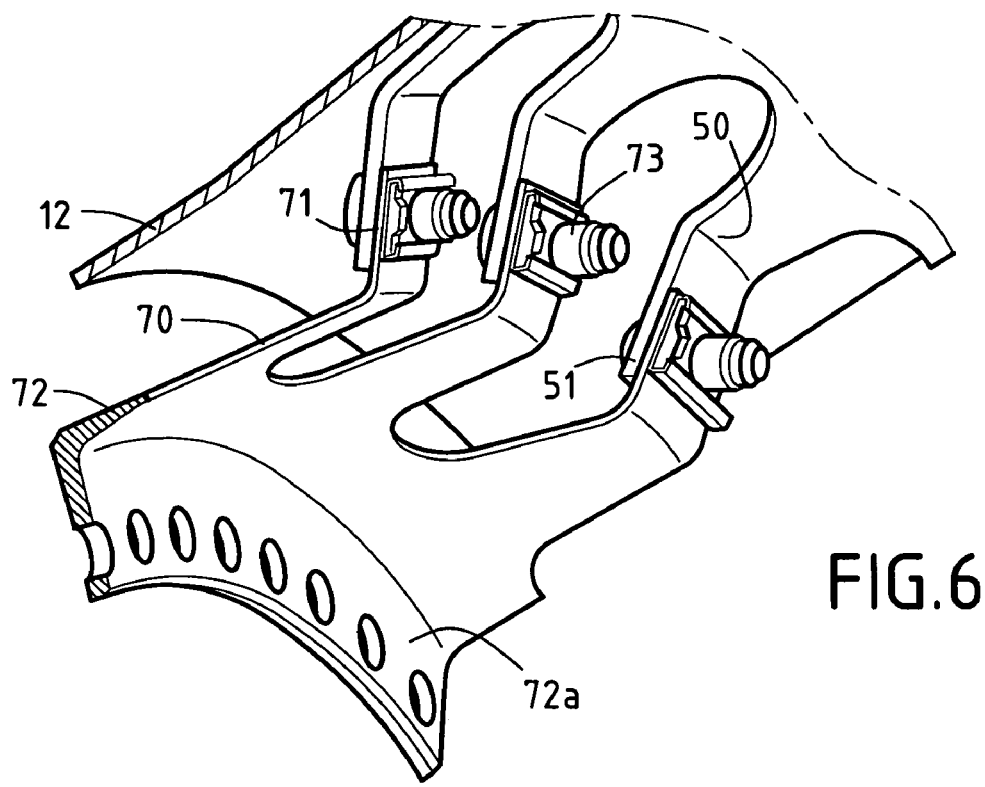
FIGS. 6 and 7 are fragmentary perspective views showing more particularly the linking members in a variant of the FIG. 5 embodiment.
Figure 7:
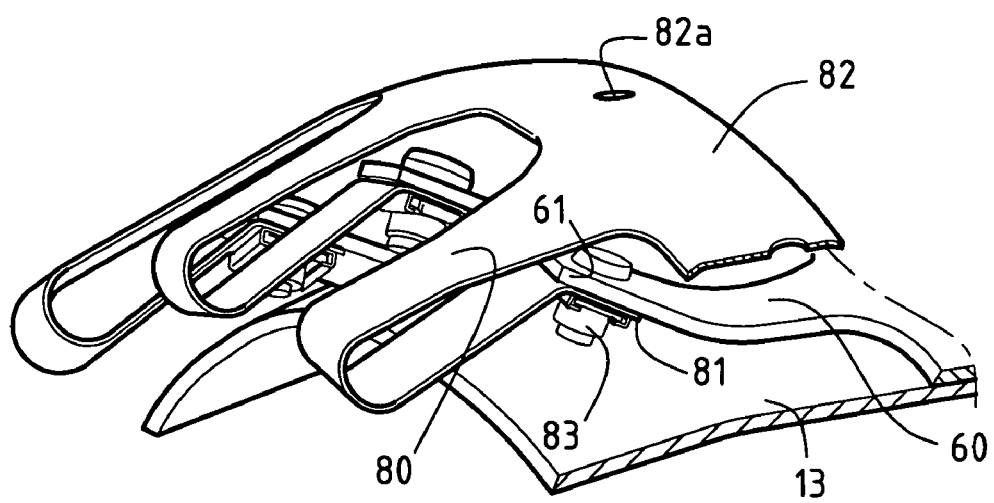

FIGS. 5 to 7 show a variant embodiment which differs from the embodiment of FIGS. 1 to 4 in that the CMC linking tabs 50 and 60 are connected to the inner and outer shrouds of the metal casing, not directly, but via flexible tabs 70, 80 made of metal. Elements in common with the of FIGS. 1 to 4 are given the same references and are not described again.

Each metal tab 70, 80 has a first end 71, 81 bolted (73, 83) to a first end 51, 61 of a respective one of the CMC tabs 50, 60. At its opposite end, a metal tab 70 is integral with a ferrule 72 that has a terminal portion 72a forming a flange that is connected to the inner metal shroud 30 by being clamped between the flanges 31a and 32a. The tabs 70 and the ferrule 72 are formed as a single piece. At its opposite end, each tab 80 is integral with a ferrule 82 which presents holes 82a. These holes pass threaded rods 48 integral with the shroud 40 and having nuts 48a engaged thereon. Naturally, other modes of fastening the ferrules 72 and 82 to the walls 30 and 40 could be provided.

The flexible metal tabs 70 and 80 are curved or folded in shape, e.g. S-shaped (tabs 70) or V-shaped (tabs 80). They are thus elastically deformable and can compensate for the CMC tabs 50 and 60 having insufficient capacity for elastic deformation to adapt to the differential expansion between the combustion chamber 10 and the metal casing 30-40.

Figure 8:
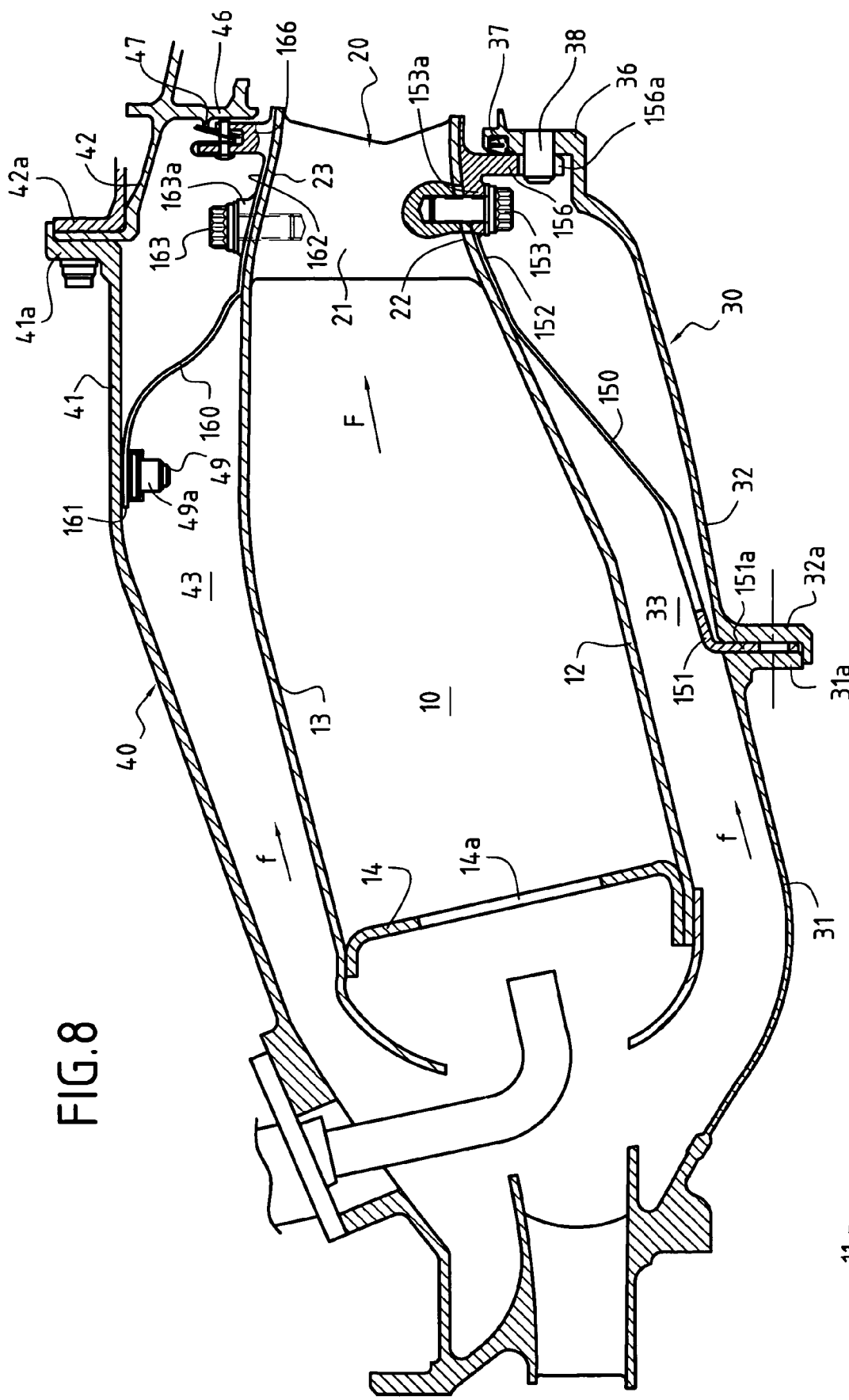
FIG. 8 is a fragmentary axial half-section view of a portion of a gas turbine in another embodiment in accordance with the invention.

FIGS. 8 to 10 shows a second particular embodiment of the invention which differs from that of FIGS. 1 to 4 in that the linking members supporting the combustion chamber and turbine nozzle assembly within the metal casing are themselves made of metal and do not include CMC tabs, and are not connected to said assembly by brazing. Elements common to the embodiments of FIGS. 1 to 4 and of FIGS. 8 to 10 are given the same references and are not described again.

The inner linking members comprise metal tabs 150 each of which is connected at a first end to the inner shroud 30 and each of which is integral, at a second end, with a sectorized platform 152.

At their first ends, the metal tabs 150 may be fastened to the inner shroud 30 directly or via an annular ferrule 151 that has a terminal portion 151a forming a flange that is connected to the shroud 30 by being clamped between the flanges 31a and 32a.

The platform 152 is made up of ring sectors 152a that are pressed against the outside surface of the wall 22, practically all the way from the connection with the wall 12 to the downstream end of the nozzle 20. The platform sectors 152a are spaced apart from one another a little in the circumferential direction so as to accommodate differential dimensional variation in this direction relative to the CMC wall 22.

The platform sectors 152a are connected to the combustion chamber and nozzle assembly 10 and 20 by means of screws 153 passing through holes formed in the sectors 152a and the wall 22, and received in tapped blind holes formed radially in the airfoils 21 and pressing against thicker portions 153a formed on the platform sectors 152a.

The sectorized platform 152 also carries an inwardly-directed radial flange 156 similar to the flange 56 of FIGS. 1 and 3 and co-operating with the flange 36 to hold the annular sealing gasket 37 and to prevent the nozzle 20 form turning about the axis 11, the locking fingers 38 engaging in housings 156a of the flange 156.

The outer linking members comprise metal tabs 160 each having a first end connected to the outer shroud 40 and each having a second end integral with a sectorized platform 162.

At their first ends, the metal tabs 160 are fastened to the outer metal shroud 40 either directly, as shown, or else via a ring-forming ferrule 161. The ring 161 presents holes 161a passing threaded rods 49 integral with the shroud 40 and having nuts 49a engaged thereon.

The platform 162 is made up of ring sectors 162a which press against the outside surface of the wall 23, practically all the way from its connection with the wall 13 to the downstream end of the nozzle 20. The platform sectors 162a are spaced apart from one another a little in the circumferential direction, like the platform sectors 152a.

The connection between the platform sectors 152a and the combustion chamber and nozzle assembly 10 and 20 is provided by screws 163 passing through holes formed in the sectors 162a and in the wall 23 and engaged in tapped blind holes formed in the airfoils 21, and they press against thicker portions 163a formed on the platform sectors 162a.

The screws 163, like the screws 162, may be made of a CMC material, for example a material similar to that of the walls 22, 23, and of the airfoils 21, or they may be of metal.

The sectorized platform 162 also carries an outwardly-directed radial flange 166 similar to the flange 66 in FIGS. 1 and 4 and co-operating with the flange 46 to hold the annular sealing gasket 47.

The tabs 160, the ring 161, and the sectorized platform 162 are advantageously made as a single piece, like the tabs 150, the ferrule 151, and the sectorized platform 152.

Orifices (not shown) may be formed through the sectorized platform 152 and the wall 22, and also through the sectorized platform 162 and the wall 23 in order to cool the airfoils 21 and the inside surfaces of the walls 22 and 23 by injecting air taken from the spaces 33 and 43.

The metal tabs 150 and 160 are curved or folded in shape, e.g. they are S-shaped, giving them sufficient capacity to deform elastically to enable them to adapt to differential variations in dimensions between the metal casing and the combustion chamber and nozzle assembly 10 and 20. The embodiment of FIGS. 7 to 10 may be selected instead of the embodiment of FIGS. 1 to 4, when the CMC linking tabs do not present sufficient flexibility to accommodate such differential variation in dimensions.

What is claimed is:

1. A gas turbine comprising an annular combustion chamber with inner and outer walls of ceramic matrix composite material, a high pressure turbine nozzle integral with a downstream end of the combustion chamber and comprising a plurality of stationary airfoils extending between the inner and outer walls of an annular flow path through the nozzle for the gas stream coming from the combustion chamber, wherein the turbine nozzle is made of a ceramic matrix composite material and is connected to the downstream end of the combustion chamber by brazing.

2. A gas turbine according to claim 1, wherein the downstream portions of the inner and outer walls of the combustion chamber are extended to the downstream end of the turbine nozzle so as form the inner and outer walls of the flow path to which the airfoils are connected by brazing.

3. A gas turbine according to claim 2, wherein each airfoil is brazed at a first radial end in a housing or indentation formed in the thickness of one of the inner and outer walls of the flow path.

4. A gas turbine according to claim 2, wherein each of the airfoils is engaged at a second radial end in an opening formed in one of the inner and outer walls of the flow path.

5. A gas turbine according to claim 4, wherein the airfoils are brazed at their second radial ends in said openings.

6. A gas turbine according to claim 1, in which the assembly constituted by the combustion chamber and the turbine nozzle is held inside a metal casing comprising an inner metal shroud and an outer metal shroud by means of internal and external linking members connecting said assembly respectively to the inner and outer shrouds, wherein the linking members comprise: inner linking tabs of ceramic matrix composite material each having a first end connected to the inner metal shroud and a second end connected to the combustion chamber and turbine nozzle assembly, and outer linking tabs made of ceramic matrix composite material each having a first end connected to the outer metal shroud and a second end connected to the combustion chamber and turbine nozzle assembly.

7. A gas turbine according to claim 6, wherein the second ends of the linking tabs are secured to inner or outer annular ferrules made of ceramic matrix composite material connected respectively to the outside surfaces of extensions of the combustion chamber walls forming the inner and outer walls of the flow path through the turbine nozzle.

8. A gas turbine according to claim 7, wherein the airfoils are brazed at their second radial ends in said openings, and wherein the second radial ends of the airfoils are also brazed to one of said annular ferrules.

9. A gas turbine according to claim 7, wherein the inner or outer annular ferrule carries a portion that co-operates with a flange integral with the inner or outer metal shroud to hold a sealing gasket to close off a downstream end of the annular space between the combustion chamber and turbine nozzle assembly and the inner or outer metal shroud.

10. A gas turbine according to claim 6, wherein the first ends of the inner and outer linking tabs are fastened directly to the inner and outer metal shrouds respectively.

11. A gas turbine according to claim 6, wherein the first ends of the inner and outer linking tabs are connected to the inner and outer metal shrouds via flexible metal tabs.

12. A gas turbine according to claim 11, wherein the flexible metal tabs have respective first ends connected to the linking tabs of ceramic matrix composite material and respective second ends integral with a ferrule fastened to the corresponding metal shroud.

13. A gas turbine according to claim 1, in which the assembly formed by the combustion chamber and the turbine nozzle is held inside a metal casing comprising inner and outer metal shrouds by means of inner and outer linking members connecting said assembly to the inner and outer shrouds, respectively, wherein the linking members comprise inner and outer metal linking tabs having respective first ends connected to the inner and outer metal shrouds, respectively, and respective second ends connected to the combustion chamber and turbine nozzle assembly.

14. A gas turbine according to claim 13, wherein the second ends of the metal linking tabs are integral with inner and outer sectorized metal platforms fastened respectively on the extensions of the combustion chamber walls forming the inner and outer walls of the flow path through the turbine nozzle.

15. A gas turbine according to claim 14, wherein the sectorized platforms are mechanically connected to the combustion chamber and turbine nozzle assembly by means of screws passing through the extensions of the combustion chamber walls forming the inner and outer walls of the flow path through the turbine nozzle, and screwed into the airfoils.

16. A gas turbine according to claim 15, wherein the screws are made of metal.

17. A gas turbine according to claim 15, wherein the screws are made of ceramic matrix composite material.

18. A gas turbine according to claim 14, wherein the inner or outer sectorized platform carries a portion that co-operates with a flange integral with the inner or outer metal shroud to hold an annular sealing gasket closing off a downstream end of the annular space between the combustion chamber and turbine nozzle assembly and the inner or outer metal shroud.

19. A gas turbine according to claim 13, wherein the first ends of the inner and outer metal linking tabs are integral with respective ferrules fastened to the inner and outer metal shrouds, respectively.

20. A gas turbine according to claim 1, in which the assembly formed by the combustion chamber and the turbine nozzle is held inside a metal casing comprising an inner metal shroud and an outer metal shroud by inner and outer linking members connecting said assembly to the inner and outer shrouds, respectively, wherein means other than the linking members are provided for locking the turbine nozzle in rotation relative to at least one of the metal shrouds so as to avoid the turning forces induced on the airfoils of the nozzle by the gas stream coming from the combustion chamber being taken up by the linking members.

21. A gas turbine according to claim 20, wherein the means for preventing turning comprise locking elements constraining at least one of inner and outer annular ferrules in rotation with a flange integral with the corresponding inner or outer metal shroud.

22. A gas turbine according to claim 20, wherein the means for preventing turning comprise locking elements constraining at least one of inner and outer sectorized platforms in rotation with a flange integral with the corresponding inner or outer metal shroud.

* * * * *